United States Patent
Kwon et al.

(10) Patent No.: US 11,777,789 B1
(45) Date of Patent: Oct. 3, 2023

(54) STABLE PASSIVE CLUSTERING

(71) Applicant: Rockwell Collins, Inc., Cedar Rapids, IA (US)

(72) Inventors: Tj T. Kwon, Marion, IA (US); James A. Stevens, Lucas, TX (US); Stephen M. Clark, Evansdale, IA (US); Ryan M. Murphy, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/093,102

(22) Filed: Jan. 4, 2023

(51) Int. Cl.
   *H04L 41/0631* (2022.01)
   *H04L 41/12* (2022.01)
   *H04W 84/18* (2009.01)

(52) U.S. Cl.
   CPC ............ *H04L 41/065* (2013.01); *H04L 41/12* (2013.01); *H04W 84/18* (2013.01)

(58) Field of Classification Search
   CPC ....... H04L 41/12; H04L 41/122; H04L 41/34; H04L 41/342; H04L 41/344; H04L 41/40; H04W 84/18
   See application file for complete search history.

(56) References Cited

U.S. PATENT DOCUMENTS

| | | |
|---|---|---|
| 10,979,348 B1 | 4/2021 | Kwon et al. |
| 11,284,295 B1 | 3/2022 | Kwon et al. |
| 11,304,084 B1 | 4/2022 | Kwon et al. |
| 11,463,934 B1 | 10/2022 | Kwon et al. |
| 2003/0041150 A1* | 2/2003 | Passman ............... H04W 84/20 709/227 |
| 2005/0041676 A1* | 2/2005 | Weinstein ............... H04L 45/03 370/401 |
| 2018/0242392 A1* | 8/2018 | Liu ........................ H04L 45/021 |
| 2019/0098693 A1* | 3/2019 | Neamatollahi .......... H04L 67/12 |
| 2021/0160664 A1* | 5/2021 | Zhang ..................... G08G 1/091 |
| 2022/0094634 A1 | 3/2022 | Kwon et al. |

FOREIGN PATENT DOCUMENTS

IN 202141020282 A 11/2021

* cited by examiner

*Primary Examiner* — Jonathan A Bui
(74) *Attorney, Agent, or Firm* — Suiter Swantz pc llo

(57) ABSTRACT

A system and method for managing node status in a MANET includes each node identifying node status data and clusterhead priority value data in data packets. Clusterhead priority values define which node dominates in the event of a clusterhead collision. Clusterhead priority values prevent clusterhead switching based solely on first to declare. Each node may define a specific set of redundancy factors when determining if the node should be characterized as a gateway node. The specific set of redundancy factors is based on node capabilities to promote stability in gateway selection.

20 Claims, 8 Drawing Sheets

STABLE PASSIVE CLUSTERING

BACKGROUND

Mobile ad-hoc networks (MANETs) are known in the art as quickly deployable, self-configuring wireless networks with no pre-defined network topology. Each communication node within a MANET is presumed to be able to move freely. Additionally, each communication node within a MANET may be required to forward (relay) data packet traffic. Data packet routing and delivery within a MANET may depend on a number of factors including, but not limited to, the number of communication nodes within the network, communication node proximity and mobility, power requirements, network bandwidth, user traffic requirements, timing requirements, and the like.

MANETs may be organized through passive clustering implemented via independent dominating sets. Passive clustering offers certain advantages, for example: it does not employ control packets to collect topological information (Instead, control information is included in outgoing data packets), and for on-demand routing, a passive clustering can be enabled quickly. However, for practical routing or the tactical base station selection algorithms, passive clustering is insufficiently stable. Where clusterheads collide, the first clusterhead to declare will dominate whether or not the first declared clusterhead is the most efficient option. Such methodology can cause arbitrary switching and instability.

It would be advantageous to have a MANET system that utilized passive clustering with high organizational stability.

SUMMARY

In one aspect, embodiments of the inventive concepts disclosed herein are directed to a system and method for managing node status in a MANET. Each node includes and identifies node status data and clusterhead priority value data in data packets. Clusterhead priority values define which node dominates in the event of a clusterhead collision. Clusterhead priority values prevent clusterhead switching based solely on first to declare.

In a further aspect, each node may define a specific set of redundancy factors when determining if the node should be characterized as a gateway node. The specific set of redundancy factors is based on node capabilities to promote stability in gateway selection.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
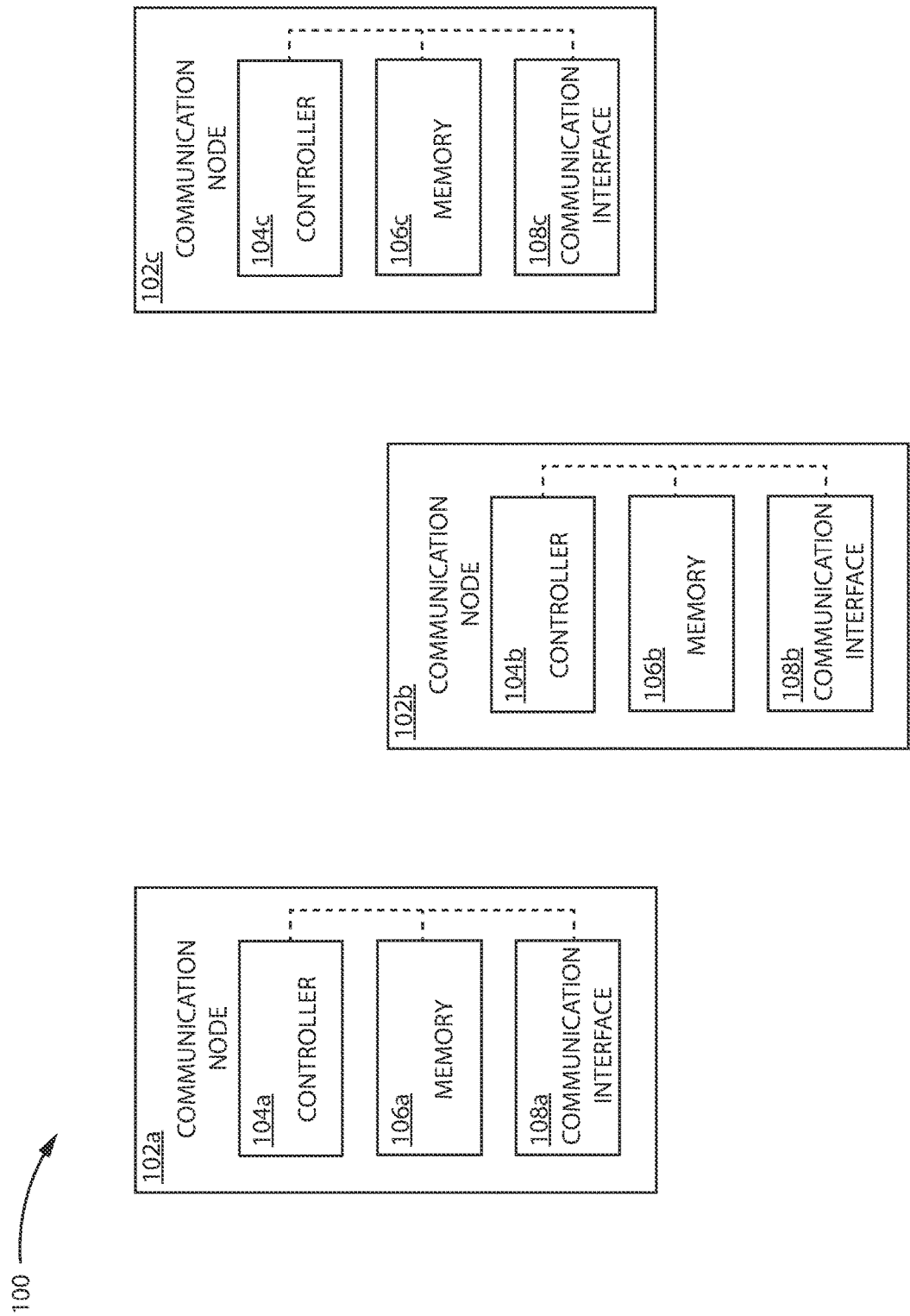
FIG. 1 illustrates a multi-node communication network, in accordance with one or more embodiments of the present disclosure.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1 a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method for managing node status in a MANET. Each node includes and identifies node status data and clusterhead priority value data in data packets. Clusterhead priority values define which node dominates in the event of a clusterhead collision. Clusterhead priority values prevent clusterhead switching based solely on first to declare. Each node may define a specific set of redundancy factors when determining if the node should be characterized as a gateway node. The specific set of redundancy factors is based on node capabilities to promote stability in gateway selection.

The present disclosure may be more readily understood with reference to U.S. patent application Ser. No. 16/369,398 (filed Mar. 29, 2019), U.S. patent application Ser. No. 16/707,111 (filed Dec. 9, 2019), and U.S. patent application Ser. No. 17/079,175 (filed Oct. 23, 2020) which are hereby incorporated by reference.

Referring to FIG. 1, a multi-node communication network 100, in accordance with one or more embodiments of the present disclosure is shown. In embodiments, the multi-node communication network 100 may include a plurality of communication nodes 102. For example, the multi-node communication network 100 may include a first communication node 102a, a second communication node 102b, and a third communication node 102c.

The multi-node communication network 100 may include any multi-node communication network. For example, the multi-node communication network 100 may include a mobile ad-hoc network (MANET) in which each communication node 102 within the multi-node communication network is able to move freely and independently. Similarly, the one or more communication nodes 102 may include any communication node which may be communicatively coupled. In this regard, the one or more communication nodes 102 may include any communication node for transmitting/transceiving data packets. For example, the one or more communication nodes 102 may include, but are not limited to, radios, mobile phones, smart phones, tablets, smart watches, laptops, and the like.

Each communication node 102 of the one or more communication nodes 102a, 102b, 102c may include, but is not limited to, a respective controller 104 (e.g., controller 104a, 104b, 104c, etc.), memory 106 (e.g., memory 106a, 106b, 106c, etc.), and communication interface 108 (e.g., communication interface 108a, 108b, 108c, etc.).

The controller 104 provides processing functionality for at least the communication node 102 and can include any number of processors, micro-controllers, circuitry, field programmable gate array (FPGA) or other processing systems, and resident or external memory for storing data, executable code, and other information accessed or generated by the communication node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communication node 102/ controller 104, such as software programs and/or code segments, or other data to instruct the controller 104, and possibly other components of the communication node 102, to perform the functionality described herein. Thus, the memory 106 can store data, such as a program of instructions for operating the communication node 102, including its components (e.g., controller 104, communication interface 108, etc.), a list of neighboring communication nodes 102, clustering status for each neighboring node 102, timestamp for neighboring node 102 communications, and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communication node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communication node 102 and the controller 104. It should be noted that while the communication interface 108 is described as a component of the communication node 102, one or more components of the communication interface 108 can be implemented as external components communicatively coupled to the communication node 102 via a wired and/or wireless connection. The communication node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communication node 102 may be configured to communicatively couple to additional communication interfaces 108 of additional communication nodes 102 of the multi-node communication network 100 using any wireless communication techniques including, but not limited to, GSM, GPRS, CDMA, EV-DO, EDGE, WiMAX, 3G, 4G, 4G LTE, 5G, WiFi protocols, RF, LoRa, and the like.

In embodiments, the controller 104 of a communication node 102 is configured to carry out various steps and functions of the present disclosure. The controller may be configured to: receive a data packet, via the communication interface, from a first communication node of the multi-node communication network; determine a number of gateway nodes and a number of clusterhead nodes communicatively coupled to the communication node; determine a clustering status of the communication node, the clustering status based on a relationship between the determined number of gateway nodes and the determined number of clusterhead nodes; and transmit the data packet, via the communication interface, to at least one additional communication node of the multi-node communication network if the determined clustering status is a gateway clustering status or a clusterhead clustering status. Each of these steps may be addressed in turn.

In embodiments, a controller 104 of a communication node 102 of a multi-node communication network 100 is configured to receive a data packet transmitted by an additional communication node 102 within the multi-node communication network 100. For example, the first communication node 102a may transmit a data packet to the second communication node 102b. The controller 104b of the second communication node 102b may then be configured to receive the data packet from the communication interface 108b.

Communication nodes 102 of the multi-node communication network 100 may be "clustered" or otherwise identified according to a plurality of clustering statuses. For example, a communication node 102 may be classified, clustered, or otherwise identified according to a clustering status including an "ordinary node" clustering status, a "gateway node" clustering status, or a "clusterhead node" clustering status. In this regard, each communication node 102 of the multi-node communication network 100 may be identified according to a respective clustering status. Traditionally in passive clustering, where there is some dispute between clusterhead nodes, communication nodes 102 transition to a clusterhead node clustering status based on which communication node 102 is the first to declare.

In at least one embodiment, each controller 104 defines and maintains a clusterhead priority value based on a plurality of factors. The plurality of factors may include the degree of connectivity of the communication node 102, the capabilities of the communication node 102, the age of the communication node 102, and the physical location of the communication node 102, as well as external factors. Where there is some dispute between clusterhead nodes, each communication node 102 provides its clusterhead priority value and the highest clusterhead priority value determines which communication node 102 will retain clusterhead node status. The clusterhead priority values prevent capricious and arbitrary clusterhead status switching based only on first declaration.

In at least one embodiment, each controller 104 may be configured to identify clustering status data and clusterhead priority value data in each packet, and using such data to define a status and clusterhead priority value for the sending node. Furthermore, the controller 104 may retrieve a clustering status and data associated with a clusterhead priority value, and embed such data in outgoing packets. For example, the controller 104 may include such data in a packet header.

Figure 2:
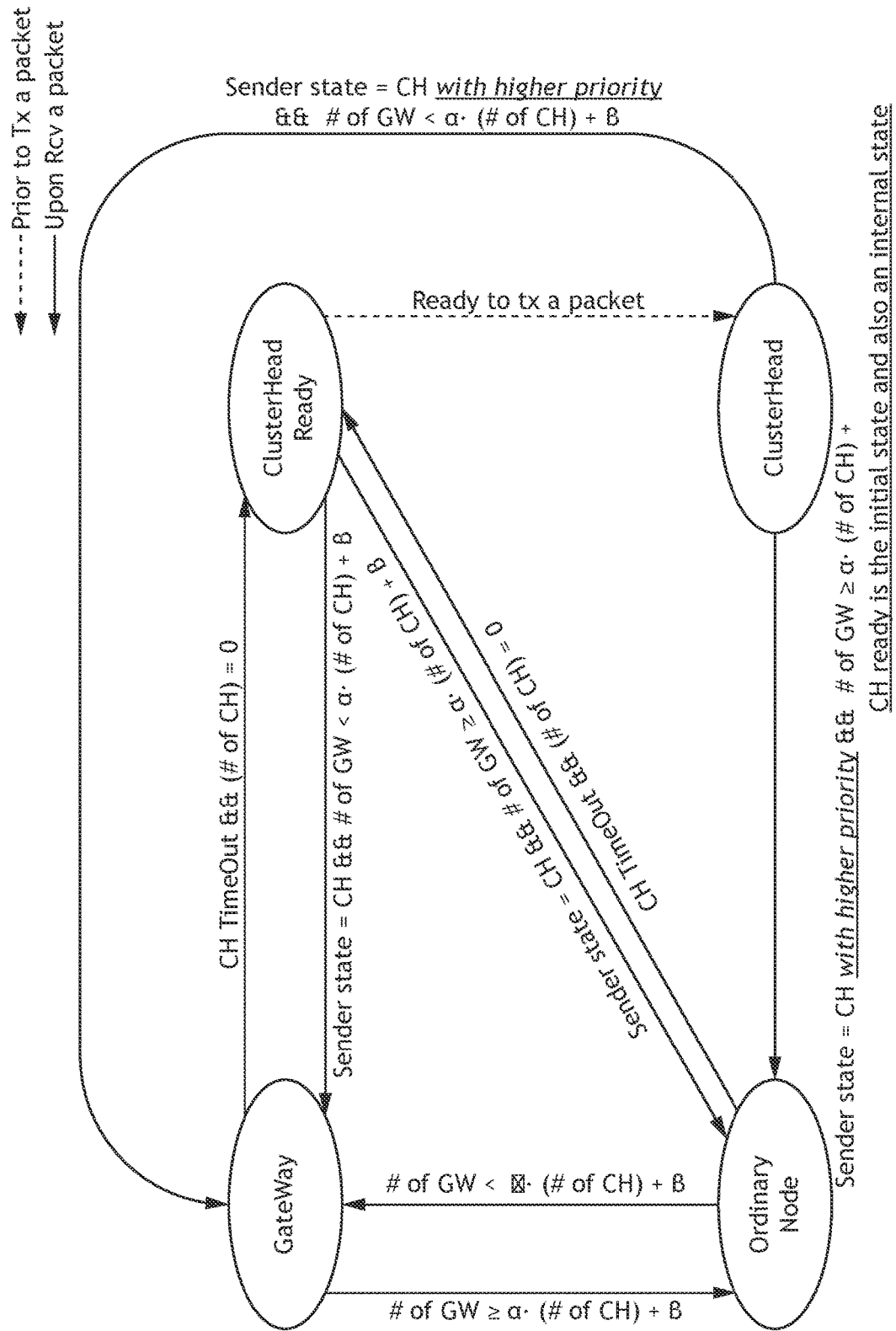
FIG. 2 illustrates a clustering state transition diagram for stable passive clustering.

Referring to FIG. 2, a clustering state transition diagram for stable passive clustering is shown. Passive clustering may be used to cluster communication nodes 102 into multiple clustering statuses. As shown in FIG. 2, stable passive clustering may include four separate clustering statuses: a "clusterhead-ready" clustering status, an "ordinary node" clustering status, a "gateway node" clustering status, and a "clusterhead node" clustering status. With stable passive clustering, each node may start out with an clusterhead ready clustering status. Additionally, ordinary nodes, clusterhead nodes, and gateway nodes may all revert back to a clusterhead-ready node if all the clusterhead nodes within the local list of the respective nodes are timed-out. For example, a gateway node may revert back to a clusterhead-ready node if all the clusterhead nodes within the local list of the gateway node are timed-out.

When a clusterhead-ready node obtains and transmits a packet, it may declare its status as a clusterhead node and transition into a clusterhead node. Additionally, upon receiving a data packet from a clusterhead node, a clusterhead-ready node may transition to a gateway node if $GW<\alpha*CH+\beta$ (wherein GW defines the determined number of gateway nodes, CH defines the determined number of clusterhead nodes, and $\alpha$ and $\beta$ define gateway redundancy factors). Conversely, upon receiving a data packet from a clusterhead node, a clusterhead-ready node may transition to an ordinary node if $GW\geq\alpha*CH+\beta$.

A clusterhead node may transition to a gateway node upon receiving a data packet from another clusterhead node if the other clusterhead node has a higher priority and $GW<\alpha*CH+\beta$. Conversely, a clusterhead node may transition to an ordinary node upon receiving a data packet from another clusterhead node if the other clusterhead node has a higher priority and $GW\geq\alpha*CH+\beta$. A gateway node may transition to an ordinary node upon receiving a data packet if the gateway node determines $GW\geq\alpha*CH+\beta$. Conversely, upon receiving a data packet, an ordinary node may transition to a gateway node if the ordinary node determines $GW<\alpha*CH+\beta$.

Each node may define a priority that influences when the node may transition to and from being a clusterhead node. The priority is defined by, but not limited to, a level of connectivity (e.g., the degree or number of neighbors), capabilities (i.e., available power, connectivity, equipment, etc.), age (i.e., a higher priority for longer server clusterhead nodes), physical location (i.e., at the top of a hill, higher altitude, etc.), and situation (i.e., noise level, error rate, jamming status, mission requirements, etc.), in addition to first declaration.

Figure 3:
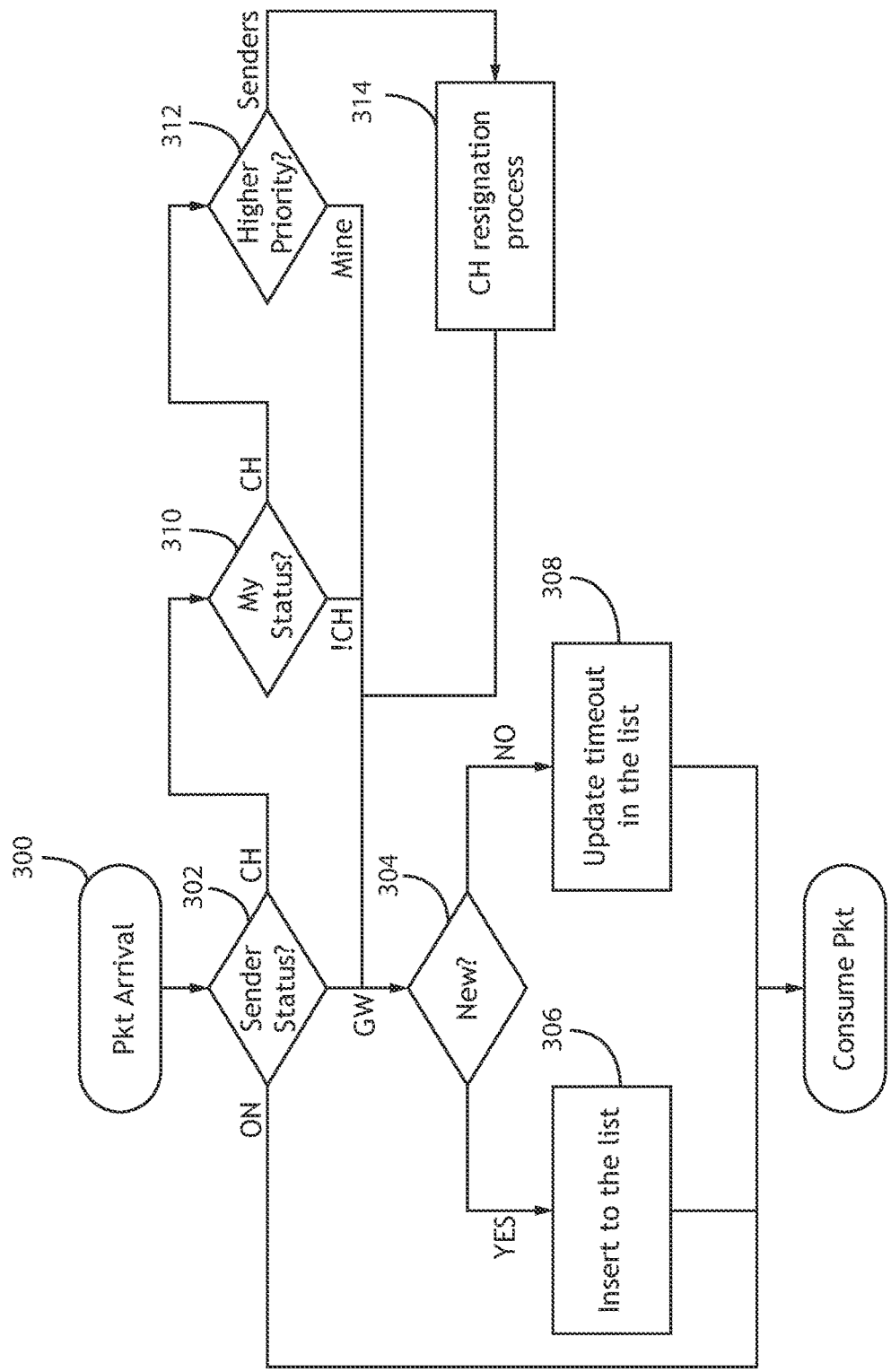
FIG. 3 illustrates a flowchart for a node during stable passive clustering.

Referring to FIG. 3, a flowchart for a node during stable passive clustering is shown. In a MANET utilizing a stable passive clustering structure, clusterheads are responsible for reliable delivery of the information to associated gateway nodes and ordinary nodes. During transmissions, a node receives 300 a packet for broadcast. The node determines 302 the status of the sender. If the sender is an ordinary node (not a gateway or clusterhead), the packet is processed and retransmitted. If the sender is a gateway node, the node determines 304 if the sender is a new gateway; if so, the sender is inserted 306 in a list of connected gateway nodes, and the packet is processed and retransmitted. If the sender is already in the list of connected gateway nodes, a timeout value associated with that gateway node is updated 308.

In at least one embodiment, if the node determines 302 that the sender is a clusterhead, the node determines 310 if the node is a clusterhead. If the node is not a clusterhead, the node determines 304 if the sender is a gateway and continues processing. If the node is a clusterhead, the node determines 312 which clusterhead is associated with a higher clusterhead priority value. If the node has a higher clusterhead priority value, the node treats the sender as a gateway and continues processing the packet. The node may communicate with the sender that the node has a higher clusterhead priority value so that the sender may begin self-resignation. Alternatively, if the sender has a higher clusterhead priority value, the node may begin a process of self-resignation 314 wherein the node recharacterizes as a gateway node and continues processing the packet.

In the context of the present disclosure, clusterhead priority values are defined by a plurality of factors that may be weighted by some predefined formula, or variably according to certain mission parameters. In at least one embodiment, the clusterhead priority value may be defined by the degree of connectivity to the clusterhead; a higher degree of connectivity (more neighboring nodes) results in a higher clusterhead priority value. In at least one embodiment, the age of the clusterhead (length of time that the node has been a clusterhead) results in a higher clusterhead priority value. In at least one embodiment, the physical location of the clusterhead may be a factor (i.e., clusterheads higher up, and therefore less susceptible to obstruction, result in a higher clusterhead priority value. In at least one embodiment, external or extraneous factors may also be included. External or extraneous factors may include factors such as environmental noise level (i.e., lower noise levels resulting in a higher clusterhead priority value), jamming (i.e., clusterheads in the processor being jammed result in a lower clusterhead priority value), error rate (i.e., a clusterhead with a lower error rate resulting a higher clusterhead priority value), mission requirements (i.e., clusterheads better equipped and/or positioned to meet mission requirements results in a higher clusterhead priority value), etc.

In at least one embodiment, data for producing the sender clusterhead priority value may be embedded in a packet header. For example, a single byte in every packet may include two bits dedicated to clustering status information and six bits dedicated to priority information exchange (i.e., for bits indicated connectivity and two bits indicating altitude). The node may thereby determine 312 which node has higher priority without consuming additional bandwidth.

In addition, clusterhead priority values may be partially defined by which clusterhead declares first. It may be appreciated that, because certain factors change in real-time, it may be impossible to determine clusterhead priority values before two clusterheads collide and need to resolve which clusterhead takes over. In at least one embodiment, each clusterhead may implement a trained machine learning algorithm (i.e., a neural network) to produce a clusterhead priority value.

The application of a weighted list of factors for determining which clusterhead has priority may prevent excessive clusterhead switching, and thereby enhance stability of the MANET.

Figure 4:
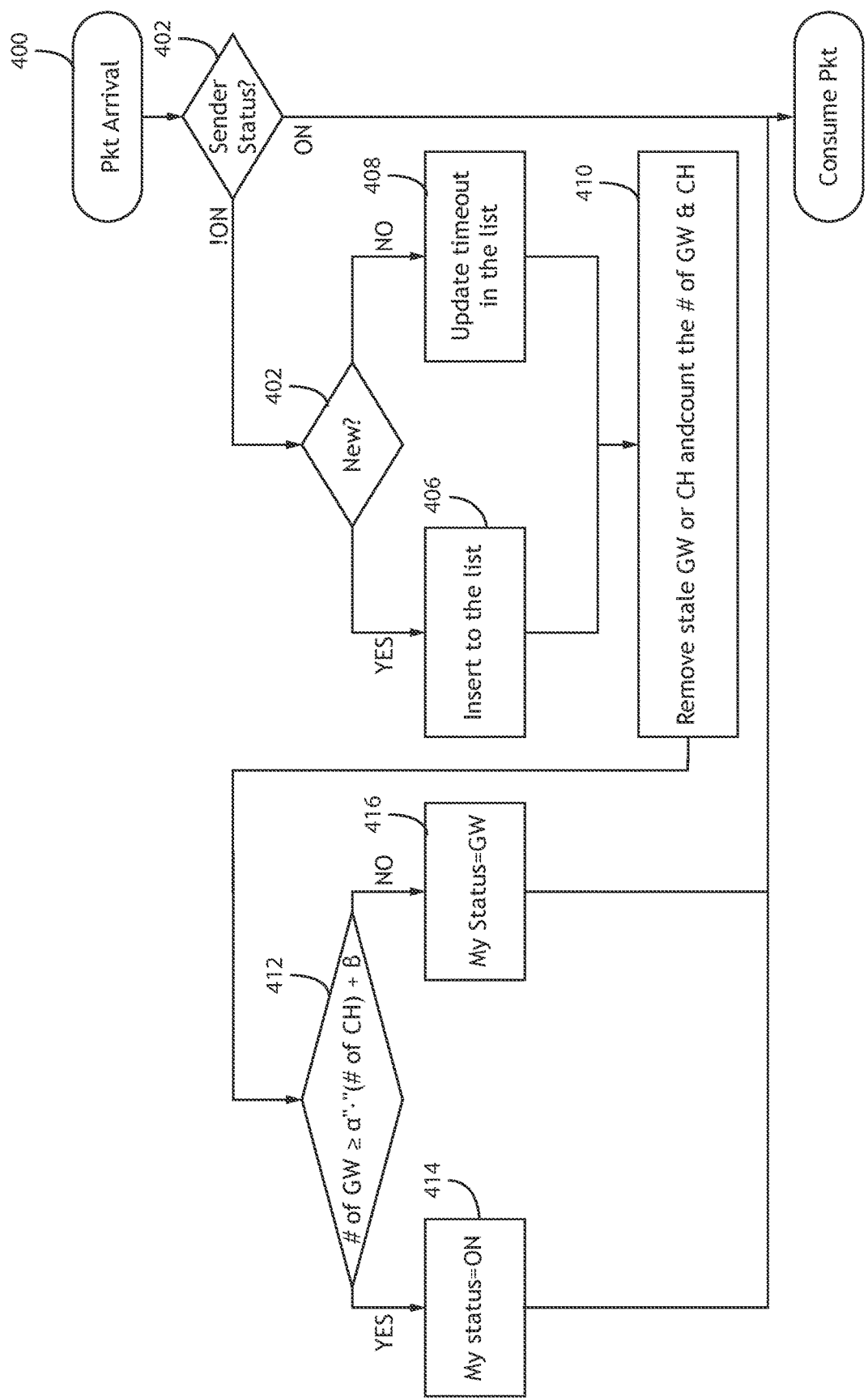
FIG. 4 illustrates a flowchart for a gateway or ordinary node during stable passive clustering.
Figure 5A:
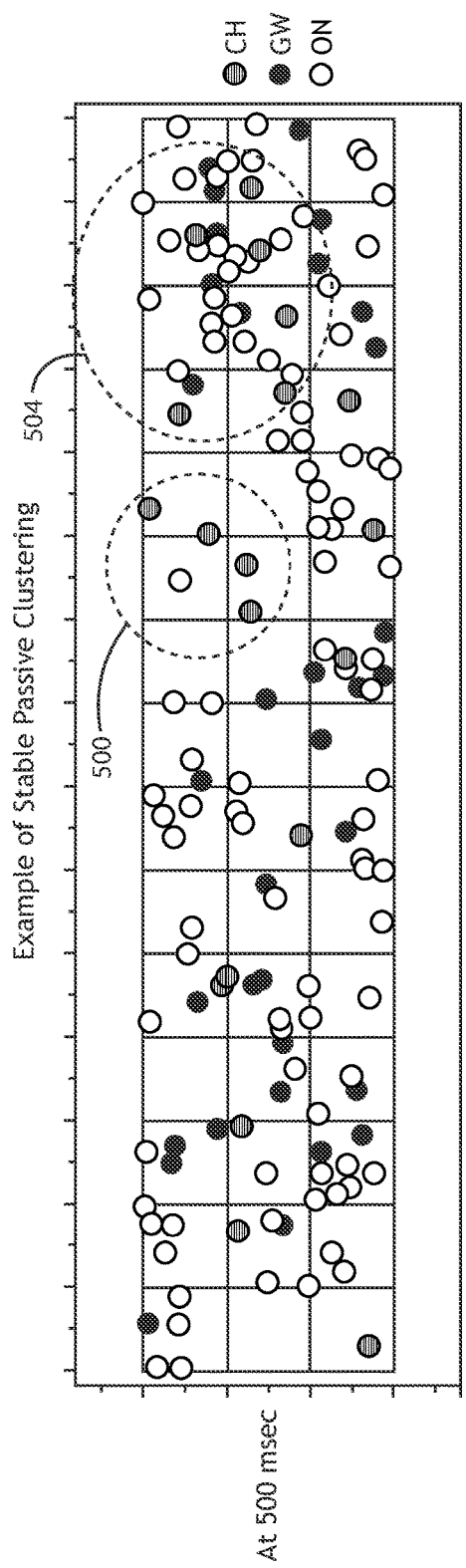
FIG. 5A illustrates a multi-node communication network in accordance with one or more embodiments of the present disclosure.
Figure 5B:
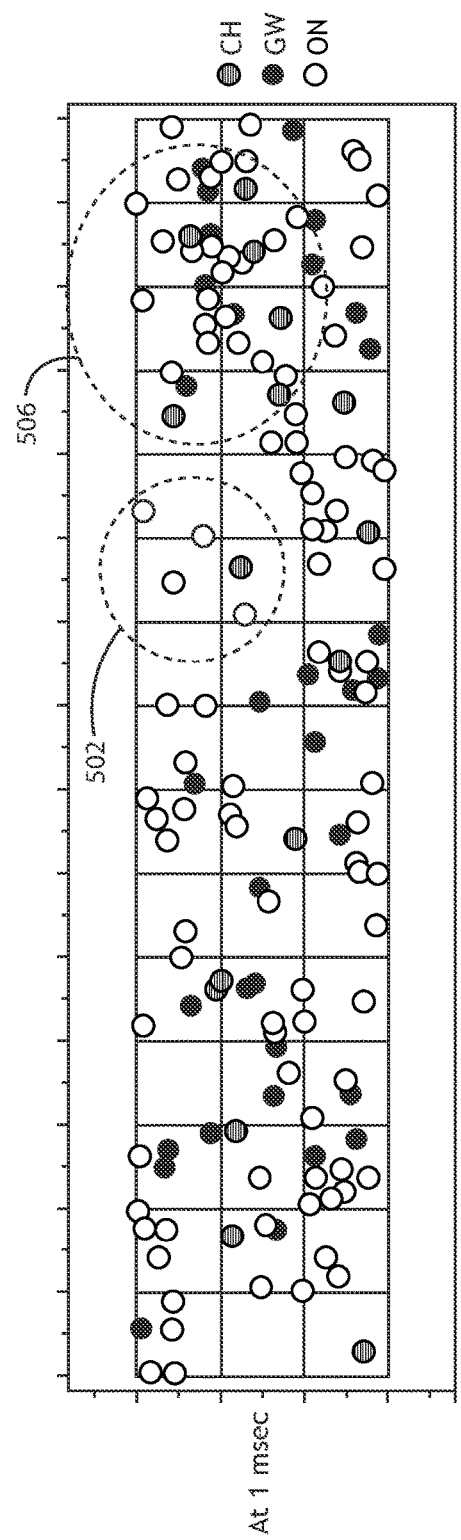
FIG. 5B illustrates a multi-node communication network in accordance with one or more embodiments of the present disclosure.
Figure 5C:
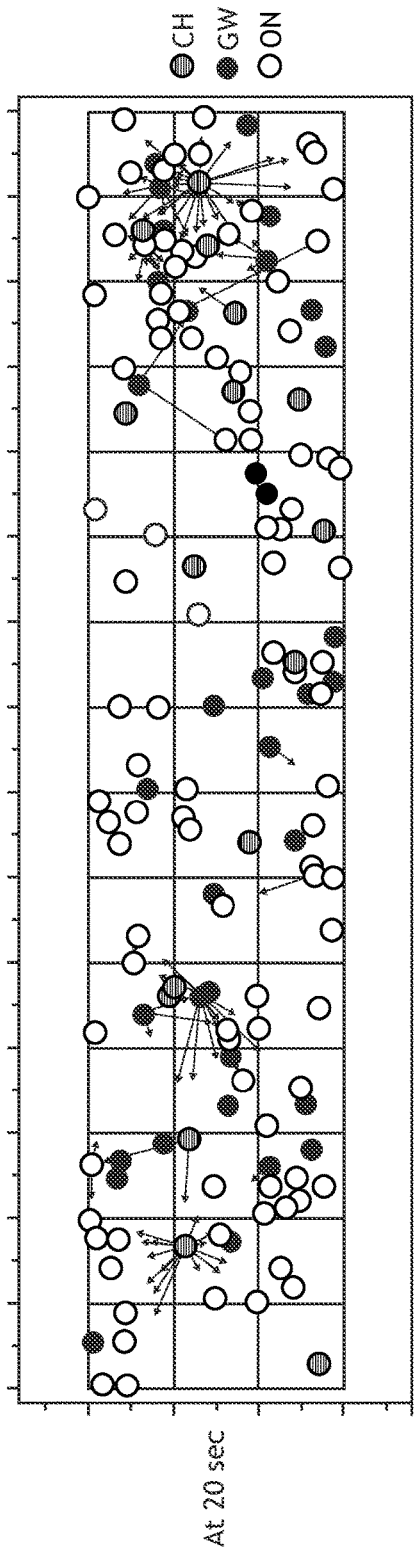
FIG. 5C illustrates a multi-node communication network in accordance with one or more embodiments of the present disclosure.
Figure 5D:
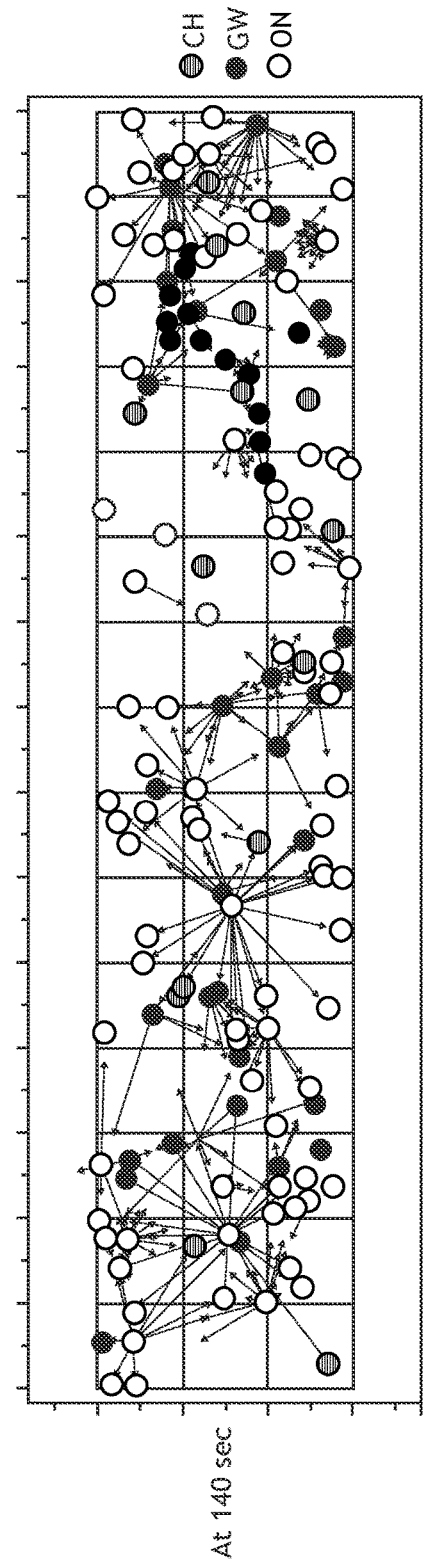
FIG. 5D illustrates a multi-node communication network in accordance with one or more embodiments of the present disclosure.
Figure 5E:
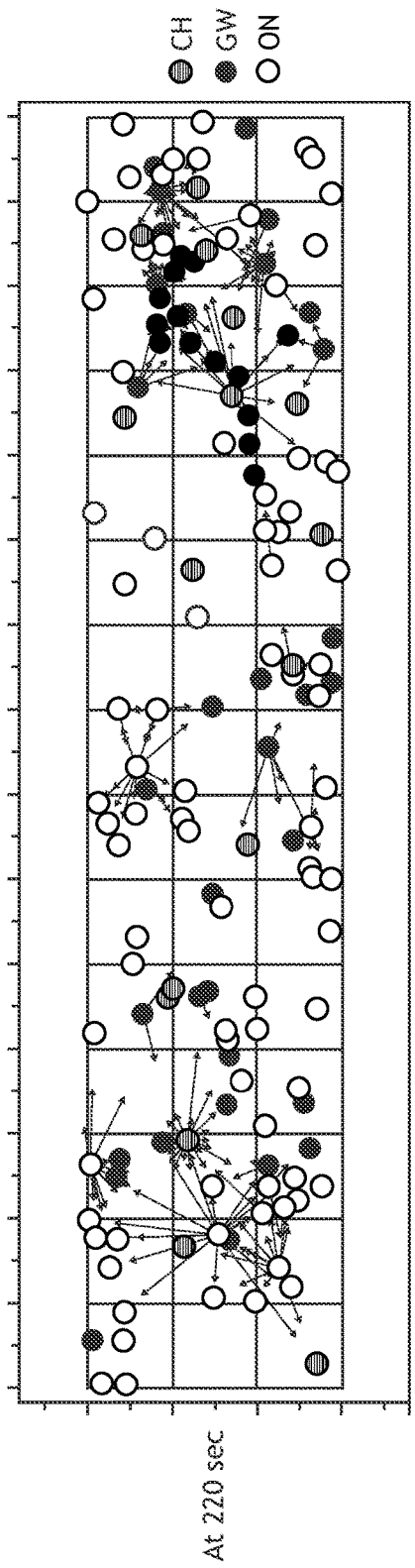
FIG. 5E illustrates a multi-node communication network in accordance with one or more embodiments of the present disclosure.
Figure 5F:
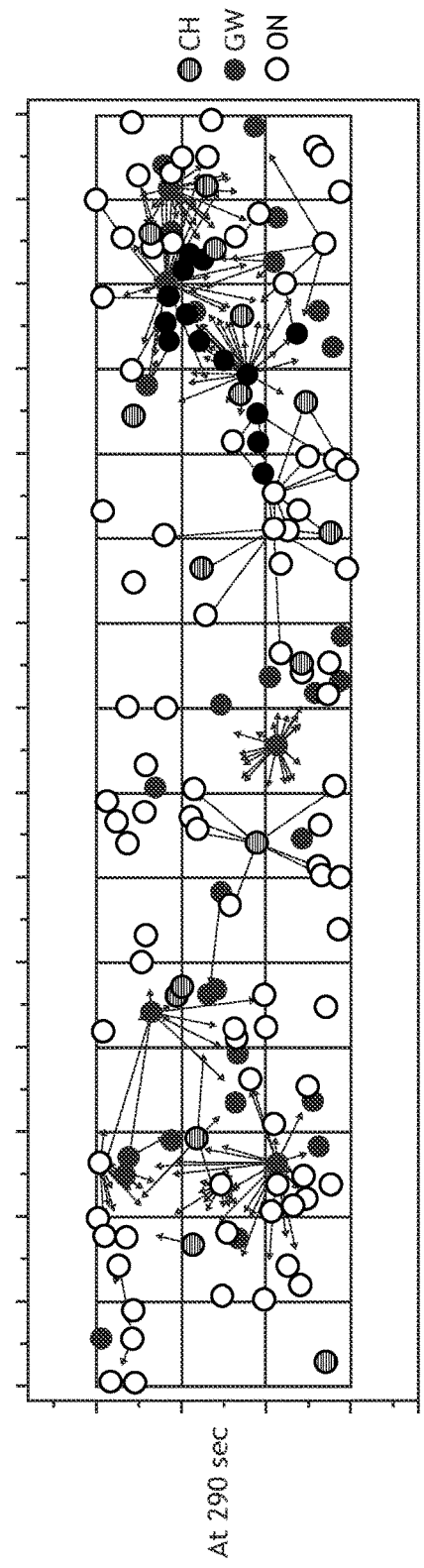
FIG. 5F illustrates a multi-node communication network in accordance with one or more embodiments of the present disclosure.
Figure 5G:
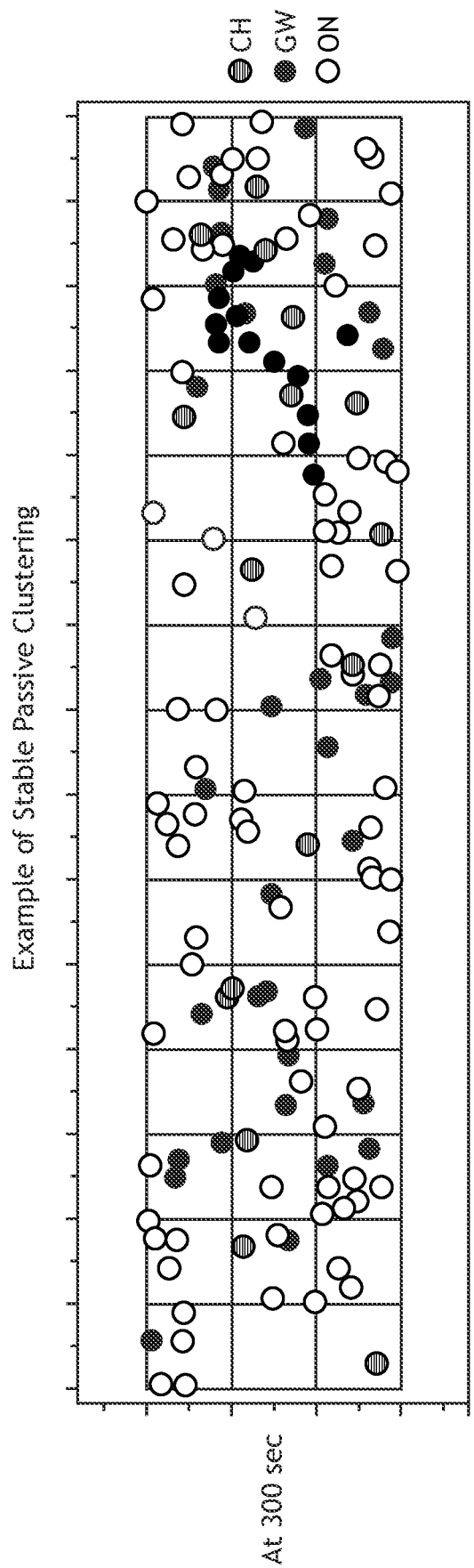
FIG. 5G illustrates a multi-node communication network in accordance with one or more embodiments of the present disclosure.

Referring to FIG. 4, a flowchart for a gateway or ordinary node during stable passive clustering is shown. In a MANET utilizing a stable passive clustering structure, when a node receives 400 a packet, the node determines 402 the status of the sender. If the sender is an ordinary node, the packet is processed. If the sender is not an ordinary node, the node determines 404 if the sender is a new gateway; if so, the sender is inserted 406 in a list of connected gateway nodes. If the sender is already in the list of connected gateway nodes, a timeout value associated with that gateway node is updated 408. The node may then remove 410 stale gateway or clusterhead nodes (i.e., based on a predefined timeout threshold), and count the number of gateway nodes and clusterhead nodes.

The node may then determine 412 if the number of gateway nodes is greater than the number of clusterhead nodes, scaled by some redundancy factor $\alpha$, plus some redundancy factor R. If the number of gateway nodes is greater, the node characterizes 414 itself as an ordinary node. If the number of gateway nodes is less, the node characterizes 416 itself as a gateway node. In each case, the packet is then processed normally.

Existing gateway node selection algorithms/heuristics may trigger gateway nod fluctuations; existing gateways discourage more gateways in a region. The nature of the MANET means that equilibrium of gateway nodes in the network is easily broken.

In at least one embodiment, the MANET may define a multi-tier gateway selection heuristic. When determining 412 the number of gateway nodes, the node may apply multiple sets of redundancy factors $\alpha$ and $\beta$. For example, the node may define sets of redundancy factors $(\alpha_1, \beta_1), (\alpha_2, \beta_2) \ldots (\alpha_n, \beta_n)$, each corresponding to a different set of node characteristics. Every node may be associated with preassigned or dynamically adjusted redundancy factors $(\alpha_i, \beta_i)$ to determine the aptness of the node being a gateway. In such embodiment, each node utilizes its specific redundancy factors $(\alpha_i, \beta_i)$ when determining 412 if the node should characterize 416 itself as a gateway node. A multi-tier gateway selection heuristic may drastically reduce construction time of gateways and avoid gateway are fluctuations.

Referring to FIGS. 5A-5G, a multi-node communication network in accordance with one or more embodiments of the present disclosure, in various states of organization, is shown. In one exemplary simulation, at five hundred milliseconds (as in FIG. 5A), the network has established some preliminary structure but a first portion 500 may include an excessive number of conflicting clusterheads while a second portion 504 includes a number of ordinary nodes but an insufficient number of gateway nodes. After one second (as in FIG. 5B), the network has resolved the excessive number of clusterheads in the first portion 502 and switched ordinary nodes to gateway nodes in the second portion 506, converging to a more desirable structure. For the remainder of the simulation, up to three hundred seconds (as in FIGS. 5C-5G), the structure of the network remains stable. Most existing algorithms, for example, the minimal connected dominating set algorithm, may take a minute of more to reach a stable structure, and may still experience arbitrary clusterhead switching.

Embodiments of the present disclosure enable a MANET, even with high density, to establish a stable, usable structure within about one hundred millisecond. Existing algorithms, especially with large density, take more than a minute.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A communication node of a multi-node communication network, the communication node comprising:
a communication interface; and
a controller communicatively coupled to the communication interface, the controller configured to:
receive a data packet, via the communication interface, from a first additional communication node of the multi-node communication network;
identify status and priority data in the data packet corresponding to a status of the first additional communication node and clusterhead priority factors of the first additional communication node;
determine that the status of the first additional communication node corresponds to a clusterhead;
calculate a first clusterhead priority value based on the clusterhead priority factors of the first additional communication node;
calculate a second clusterhead priority value based on clusterhead priority factors of the communication node;
compare the first clusterhead priority value to the second clusterhead priority value; and
resign as a clusterhead if the first clusterhead priority value is greater.

2. The communication node of claim 1, wherein the controller is further configured to:
remove the status and priority data from the data packet;
prepare new status and priority data corresponding to the status of the communication node and clusterhead priority factors of the communication node;
incorporate the new status and priority data into the data packet; and
retransmit the data packet.

3. The communication node of claim 2, wherein clusterhead priority factors comprise one or more of:
a connectivity value defined by a number of neighbors;
a physical location of the communication node; or
an age of the communication node.

4. The communication node of claim 3, wherein calculating the first clusterhead priority value and calculating the second clusterhead priority value comprise identifying one or more environmental factors.

5. The communication node of claim 4, wherein calculating the first clusterhead priority value and calculating the second clusterhead priority value comprise applying a weighting to each of the corresponding clusterhead priority factors and one or more environmental factors.

6. The communication node of claim 1, wherein the controller is further configured to:
define a set of specific redundancy factors based on one or more characteristics of the communication node; and
apply the set of specific redundancy factors when determining if the communication node should be a gateway node.

7. The communication node of claim 6, wherein the set of specific redundancy factors are dynamically adjustable.

8. A method for managing clusterhead collision in a mobile ad-hoc network (MANET) comprising:
receiving a data packet, with a communication node, from a first additional communication node of the MANET;
identifying status and priority data in the data packet corresponding to a status of the first additional communication node and clusterhead priority factors of the first additional communication node;
determining that the status of the first additional communication node corresponds to a clusterhead;
calculating a first clusterhead priority value based on the clusterhead priority factors of the first additional communication node;
calculating a second clusterhead priority value based on clusterhead priority factors of the communication node;
comparing the first clusterhead priority value to the second clusterhead priority value; and
the communication node with the lower clusterhead priority value resigning as a clusterhead.

9. The method of claim 8, further comprising:
removing the status and priority data from the data packet;
preparing new status and priority data corresponding to the status of the communication node and clusterhead priority factors of the communication node;
incorporating the new status and priority data into the data packet; and
retransmitting the data packet.

10. The method of claim 9, wherein clusterhead priority factors comprise one or more of:
a connectivity value defined by a number of neighbors;
a physical location of the communication node; or
an age of the communication node.

11. The method of claim 10, wherein calculating the first clusterhead priority value and calculating the second clusterhead priority value comprise identifying one or more environmental factors.

12. The method of claim 11, wherein calculating the first clusterhead priority value and calculating the second clusterhead priority value comprise applying a weighting to each of the corresponding clusterhead priority factors and one or more environmental factors.

13. The method of claim 8, further comprising:
defining a set of specific redundancy factors based on one or more characteristics of the communication node; and
applying the set of specific redundancy factors when determining if the communication node should be a gateway node.

14. The method of claim 13, wherein the set of specific redundancy factors are dynamically adjustable.

15. A mobile ad-hoc network (MANET) comprising a plurality of communication nodes, each communication node comprising:
a communication interface; and
a controller communicatively coupled to the communication interface, the controller configured to:
receive a data packet, via the communication interface, from a first additional communication node in the plurality of communication nodes;
identify status and priority data in the data packet corresponding to a status of the first additional communication node and clusterhead priority factors of the first additional communication node;
determine that the status of the first additional communication node corresponds to a clusterhead;
calculate a first clusterhead priority value based on the clusterhead priority factors of the first additional communication node;
calculate a second clusterhead priority value based on clusterhead priority factors of a present communication node;
compare the first clusterhead priority value to the second clusterhead priority value; and
resign as a clusterhead if the first clusterhead priority value is greater.

16. The MANET of claim 15, wherein each controller is further configured to:
  remove the status and priority data from the data packet;
  prepare new status and priority data corresponding to the status of the present communication node and clusterhead priority factors of the present communication node;
  incorporate the new status and priority data into the data packet; and
  retransmit the data packet.

17. The MANET of claim 16, wherein clusterhead priority factors comprise one or more of:
  a connectivity value defined by a number of neighbors;
  a physical location of the communication node;
  an age of the communication node; or
  one or more environmental factors.

18. The MANET of claim 17, wherein calculating the first clusterhead priority value and calculating the second clusterhead priority value comprise applying a weighting to each of the corresponding clusterhead priority factors and one or more environmental factors.

19. The MANET of claim 15, wherein each controller is further configured to:
  define a set of specific redundancy factors based on one or more characteristics of the present communication node; and
  apply the set of specific redundancy factors when determining if the present communication node should be a gateway node.

20. The MANET of claim 19, wherein the set of specific redundancy factors are dynamically adjustable.

* * * * *